United States Patent
Bird et al.

(10) Patent No.: US 7,661,125 B2
(45) Date of Patent: *Feb. 9, 2010

(54) SYSTEM FOR PROVIDING AND UTILIZING A NETWORK TRUSTED CONTEXT

(75) Inventors: Paul M. Bird, Markham (CA); Gayathiri R. Chandran, San Jose, CA (US); Curt L. Cotner, Gilroy, CA (US); Adrian B. Lobo, Sunnyvale, CA (US); James W. Pickel, Gilroy, CA (US); Walid Rjaibi, Markham (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/166,839

(22) Filed: Jul. 2, 2008

(65) Prior Publication Data
US 2008/0271114 A1 Oct. 30, 2008

Related U.S. Application Data

(63) Continuation of application No. 11/023,921, filed on Dec. 27, 2004, now Pat. No. 7,568,039.

(51) Int. Cl.
*G06F 21/00* (2006.01)
*H04L 9/00* (2006.01)
(52) U.S. Cl. ............ 726/1; 726/12; 726/3; 709/229; 709/204; 709/205; 709/206; 709/207
(58) Field of Classification Search .......... 726/1, 726/12, 11, 13, 3; 713/184, 185, 182, 155, 713/151; 709/207, 204, 205, 206
See application file for complete search history.

(56) References Cited

U.S. PATENT DOCUMENTS

| | | | |
|---|---|---|---|
| 5,586,260 A | 12/1996 | Hu |
| 5,598,536 A | 1/1997 | Slaughter et al. |
| 5,619,657 A | 4/1997 | Sudama et al. |
| 5,841,869 A | 11/1998 | Merkling et al. |
| 6,052,785 A | 4/2000 | Lin et al. |
| 6,076,092 A | 6/2000 | Goldberg et al. |
| 6,112,196 A | 8/2000 | Zimowski et al. |
| 6,212,636 B1 | 4/2001 | Boyle et al. |
| 6,266,666 B1 | 7/2001 | Ireland et al. |
| 6,286,104 B1 | 9/2001 | Buhle et al. |

(Continued)

OTHER PUBLICATIONS

Park, et al., "Secure Cookies on the Web," Jul. 2000, IEEE Internet Computing 4.4, pp. 36-44.

(Continued)

*Primary Examiner*—Jude J Jean Gilles
(74) *Attorney, Agent, or Firm*—Sughrue Mion, PLLC

(57) ABSTRACT

A system for establishing a connection between a data server and a middleware server is disclosed. The system includes defining a plurality of trust attributes corresponding to a trusted context between the middleware server and the data server and validating the plurality of trust attributes against a plurality of attributes corresponding to the middleware server. The plurality of attributes provided in a connection request. The system also includes establishing the trusted context based on the validating the plurality of trust attributes.

25 Claims, 3 Drawing Sheets

U.S. PATENT DOCUMENTS

| | | | |
|---|---|---|---|
| 6,349,338 | B1 | 2/2002 | Seamons et al. |
| 6,377,994 | B1 | 4/2002 | Ault et al. |
| 6,434,543 | B1 | 8/2002 | Goldberg et al. |
| 6,516,416 | B2 | 2/2003 | Gregg et al. |
| 6,631,371 | B1 | 10/2003 | Lei et al. |
| 6,745,332 | B1 | 6/2004 | Wong et al. |
| 7,174,565 | B2 | 2/2007 | Kadyk et al. |
| 7,181,764 | B2 | 2/2007 | Zhu et al. |
| 7,325,246 | B1 | 1/2008 | Halasz et al. |
| 2002/0016777 | A1 | 2/2002 | Seamons et al. |
| 2002/0049914 | A1 | 4/2002 | Inoue et al. |
| 2002/0065956 | A1 | 5/2002 | Yagawa et al. |
| 2002/0184217 | A1* | 12/2002 | Bisbee et al. ............... 707/9 |
| 2003/0014527 | A1 | 1/2003 | Terwindt et al. |
| 2003/0236975 | A1 | 12/2003 | Birk et al. |
| 2004/0064335 | A1 | 4/2004 | Yang |
| 2005/0289648 | A1* | 12/2005 | Grobman et al. ............. 726/12 |
| 2006/0075075 | A1 | 4/2006 | Mallnen et al. |

OTHER PUBLICATIONS

Chadwick, et al., "Role-Based Access Control With X.509 Attribute Certificates," IEEE Internet Computer 7.2. Mar. 2003, pp. 62-69.

Kristol, et al., "HTTP State Management Mechanism," 1997, RFC Editor.

U.S. Appl. No. 11/008,507, filed Dec. 8, 2004, titled Method, System and Program for Establishing a Trusted Relationship Between a Data Server and a Middleware Server.

\* cited by examiner

SYSTEM FOR PROVIDING AND UTILIZING A NETWORK TRUSTED CONTEXT

CROSS-REFERENCE TO RELATED APPLICATIONS

Under 35 USC § 120, this application is a continuation application and claims the benefit of priority to U.S. patent application Ser. No. 11/023,921 filed Dec. 27, 2004, entitled "Method for Providing and Utilizing a Network Trusted Context", and is related to U.S. patent application Ser. No. 11/008,507, filed Dec. 8, 2004, all of which is incorporated herein by reference.

FIELD OF THE INVENTION

The present invention relates to connections between servers and more particularly to a system for providing a trusted context between servers.

BACKGROUND OF THE INVENTION

FIG. 1 depicts a conventional system 10 for allowing end users to access data through a data server. The conventional system 10 includes a conventional middleware server 20, a conventional data server 40, a database 50, and a network 30 connecting the conventional middleware server 20 to the conventional data server 40. End users (not shown) can connect to the conventional middleware server 20, and thus the data server 40, through clients 22, and 24.

FIG. 2 depicts a conventional method 60 for accessing data in the database 50. The conventional method 50 commences after an end user logs onto the conventional middleware server 40. The conventional middleware server 20 requests a connection with the conventional data server 40, via step 62. To do so, the conventional middleware server 20 provides the conventional data server 40 with a user identification for the conventional middleware server 20. The conventional data server 40 validates this user identification for the conventional middleware server 20, via step 64. If the conventional middleware server is authorized to connect to the conventional data server 40, then a connection is established, via step 66. Using this connection, the database 50 can be accessed through the conventional middleware server 20 and returned to end users, via step 68. The connection may be terminated at the end of the session, via step 70.

Although the conventional system 10 and method 60 function, one of ordinary skill in the art will readily recognize that there are significant drawbacks. The use of the database 50 is managed through the connection between the conventional data server 40 and the conventional middleware server 20 established in step 66. However, this connection is established based on the user identification for the conventional middleware server 20. The identity of the end user that is utilizing the database 50 is not tracked. Consequently, there is a loss of end user accountability. Furthermore, because access to the database 50 is managed based upon the user identification of the conventional middleware server 20, that middleware server user IDidentification is granted all the privileges required for the actions of all of the end users connecting to the database 50 through the conventional middleware server 20. This results in weakened security since because every end user has access to the same set of privileges on the database 40. For example, all end users of the conventional middleware server 20 may access the same data on the database 40 even though the end user IDs themselves may not otherwise be authorized to access the data. Security for the database 50 is thereby weakened. Alternatively, each time a new end user accesses the database 40 through the conventional middleware server 20, the connection between the conventional middleware server 20 and the data server 40 is re-established based on the identification of the end user. The method 60 is thus repeated and the conventional middleware server 20 re-authenticated each time a new end user desires access to the database 50. Providing new connections for each end user ameliorates the weakening of security discussed above. Furthermore, the connection may allow the end user to obtain only those privileges to which the end user is entitled. However, overhead is greatly increased and performance suffers significantly.

Accordingly, what is needed is an improved mechanism for managing connections between a middleware server and a data server. The present invention addresses such a need.

BRIEF SUMMARY OF THE INVENTION

The present invention provides a system for establishing a connection between a data server and a middleware server is disclosed. The system comprise defining a plurality of trust attributes corresponding to a trusted context between the middleware server and the data server and validating the plurality of trust attributes against a plurality of attributes corresponding to the middleware server. The plurality of attributes provided in a connection request. The system also comprise establishing the trusted context based on the validating the plurality of trust attributes.

According to the system disclosed herein, the present invention allows a trusted connection to be established and aspects of the relationships between the middleware server, data server, and/or end users managed using roles.

DETAILED DESCRIPTION OF THE INVENTION

The present invention relates to computer systems. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The present invention provides a system for establishing a connection between a data server and a middleware server is disclosed. The system comprise defining a plurality of trust attributes corresponding to a trusted context between the middleware server and the data server and validating the plurality of trust attributes against a plurality of attributes corresponding to the middleware server. The plurality of attributes are provided directly or indirectly in a connection request. The system also comprise establishing the trusted context based on the validating the plurality of trust attributes.

The present invention will be described in terms of a particular data servers, middleware servers, and networks. However, one of ordinary skill in the art will readily recognize that the system can operate for other servers, middleware servers and networks having other and/or additional components and which are connected in a different manner not inconsistent with the present invention.

Figure 1:
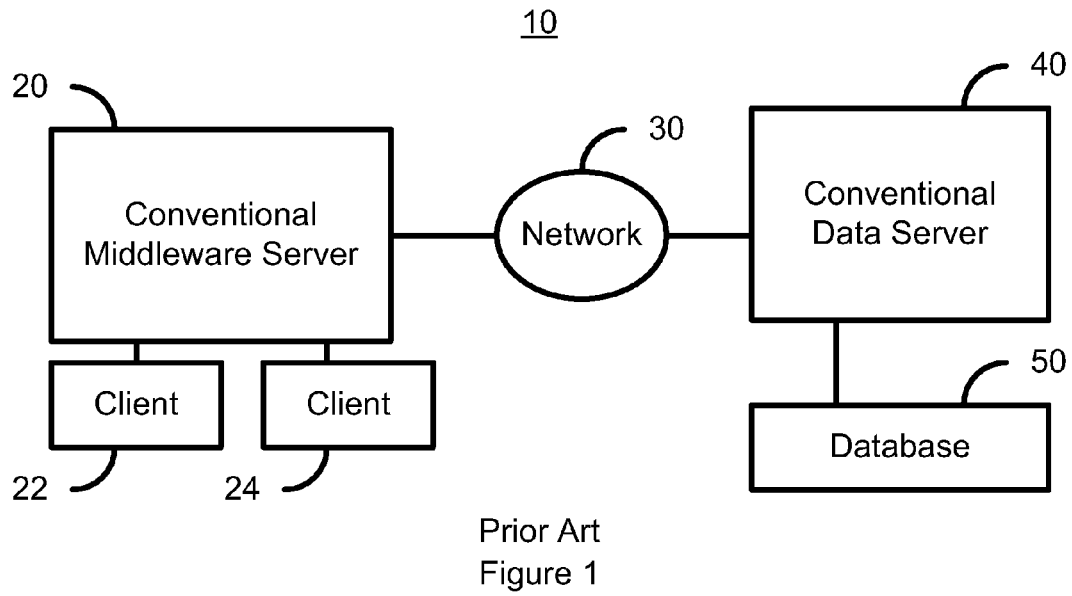
FIG. 1 is a diagram of a conventional system that can be used to access a database.
Figure 2:
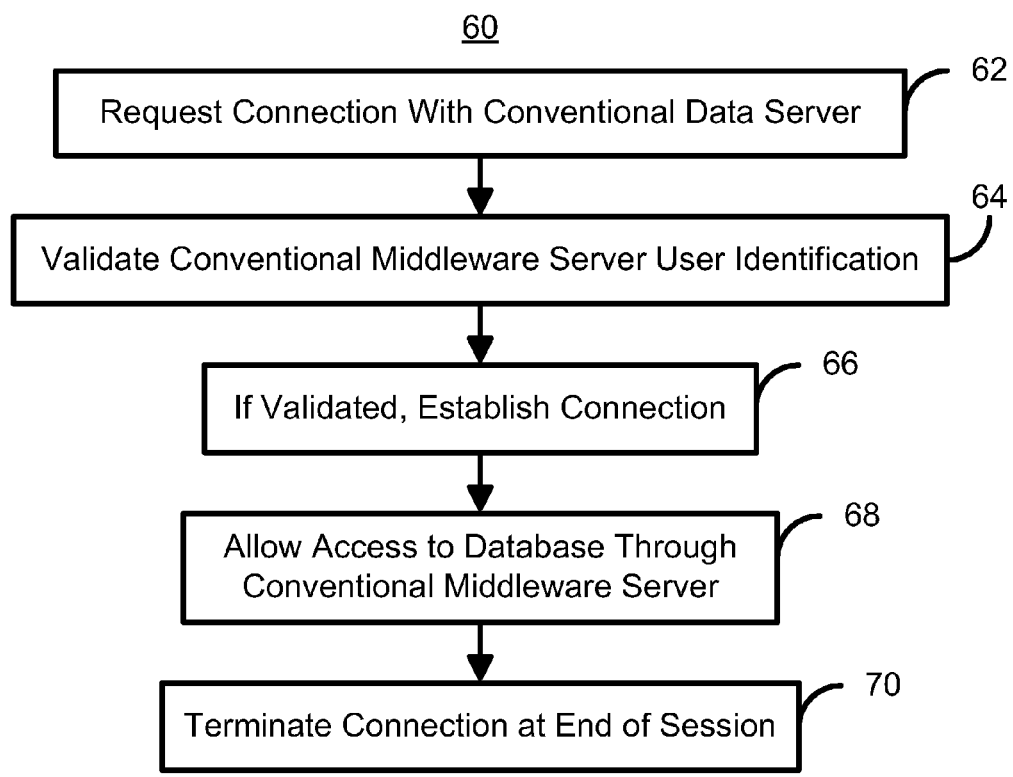
FIG. 2 depicts a conventional method for accessing a database through a middleware server and data server.
Figure 3:
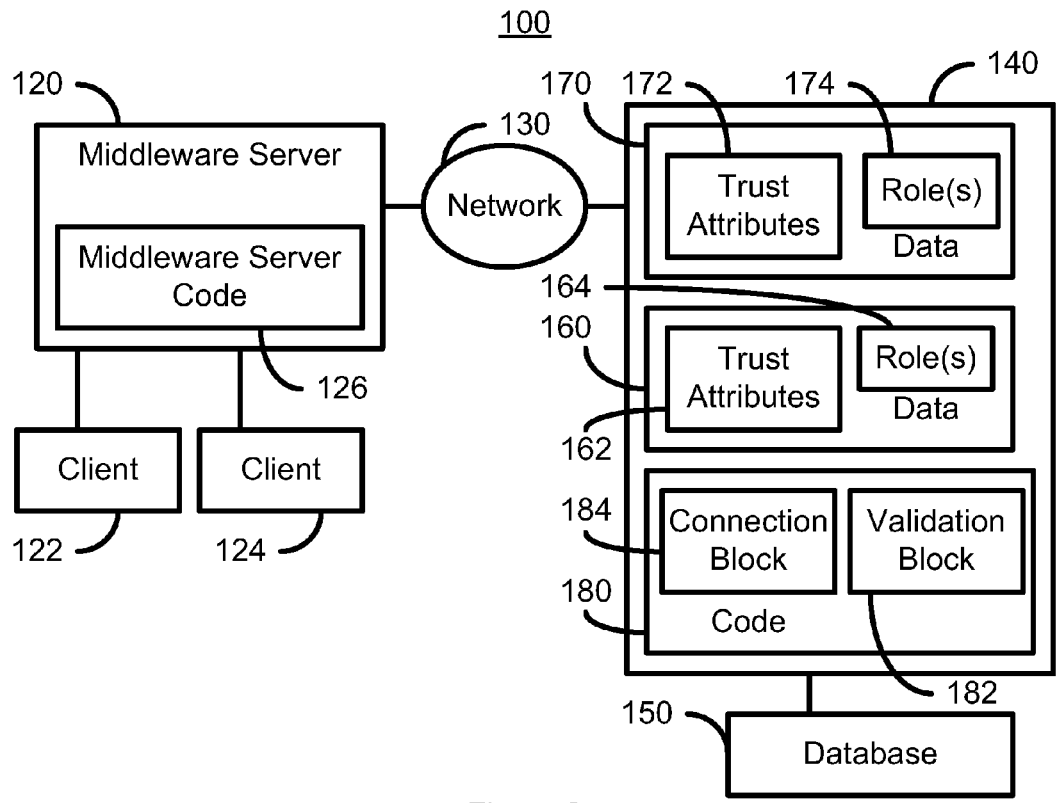
FIG. 3 is a block diagram depicting one embodiment of a computer system in accordance with the present invention that provides a trusted context for connecting between a middleware server and a data server.

FIG. 3 is a block diagram depicting one embodiment of a system 100 in accordance with the present invention that provides a trusted context for connecting between a middleware server and a data server. The system 100 includes a middleware server 120 connected to a data server 140 through a network 130. The middleware server 120 is connected to clients 122 and 124, which may be utilized by end users to connect to the middleware server 120. The middleware server 120 also preferably includes code 126 used in creating a trusted context. The code 126 may allow the middleware server 120 to request the connection, request that the connection be made as a trusted context if desired, and a mechanism for exchanging information relating to the trusted context, such as tokens relating to the trusted context (described below) that may be passed between the middleware server 120 and data server 140, as well as APIs used in establishing the trusted context.

The data server 140 is coupled with a database 150 and manages access to the database 150. The data server 140 includes code 180 for managing connections with the middleware server 120. The code 180 includes a validation block 182 and a connection block 184. The validation block 182 is used to validate attributes of the middleware server. The connection block 184 can be used to manage other aspects of establishing a connection in accordance with the present invention between the middleware server 120 the data server 140. Note that the code 180 may include a different arrangement of components 182 and 184 in order to perform the desired functions, as well as other and/or additional components. The data server 140 also includes data 160 and 170 corresponding to trusted connections. At least one of the data 160 and 170 corresponds to a trusted connection established between the middleware server 120 and the data server 140. The data 160 and 170 includes trusted attributes 162 and 172, respectively, and may include roles 164 and 174, respectively, for the corresponding connection. Note that although roles 164 and 174 are described as being associated with a user within a particular trusted context, they can be associated either to all users of the trusted context level or to a specific user within the context. In such an embodiment, individual users can obtain additional privileges using the role, but only through the trusted context. This prevents end users from accessing objects outside of the protected middleware server 120 through the role when connecting to the database 150 outside of the trusted context.

The system 100 can create a trusted context between the middleware server 120 and the data server 140. A trusted context is one which is believed to be secure for at least some purpose and is a candidate for re-use with or without re-authentication of the end user.

Trusted attributes 162 and 172 are used to determine whether a particular request for a connection is a candidate for a trusted context. In one embodiment, only requests asking for a trusted context would be candidates for a trusted context. In another embodiment, any request from the middleware server 120 is a candidate for a trusted context. Examples of trusted attributes 162 and 172 include but are not limited to the user identification for the middleware server 120, attributes of the specific connection that can be trusted such as the system authorization id, encryption, authentication, protocol and job name, as well as the IP address of or domain name for the middleware server connection to the data server 140. In an alternate embodiment, attributes of the client 122 or 124 using the connection might be a trusted attribute 162 or 172, such as the IP address of the client 122 or 124. In such an embodiment, the middleware server 120 would provide the identity of the client 122 or 124. For example, trusted attributes 162 or 172 may take the form: SYSTEM AUTHID WASADM1; Address 9.26.113.204, Address 9.26.113.208, and Address 9.26.113.219. Such trusted attributes 162 or 172 can be used to validate creation of a trusted context for a middleware server having a user identification WASADMI, for connections having addresses 9.26.113.204, and 9.26.113.218.

Roles 164 and 174 can be used to manage aspects, such as privileges granted, of a trusted connection. Examples of analogous roles can be found SQL. For example, access to database objects of the database 150, authorization of end users, and other privileges granted to end users may be managed through the use of roles. A role 164 and/or 174 could encompass all end users in the trusted context. For such a role 164 or 174, any privilege granted to the role 164 or 174 would be granted to the end user. A role 164 and/or 174 could also be associated with individual end users or subsets of the end users of the trusted context. For such a role 164 or 174, only the associated the end user(s) would inherit the privileges of the role 164 or 174. Such roles 164 and 174 may thus include data related not only to the privileges granted, but information, such as end user identification, required for the privilege to be granted. Such roles 164 or 174 would also override relevant defaults for the trusted context, replacing the appropriate defaults with rules for the roles 164 and 174. Thus, the roles 164 and 174 allow the trusted context to be managed at a finer level.

Figure 4:
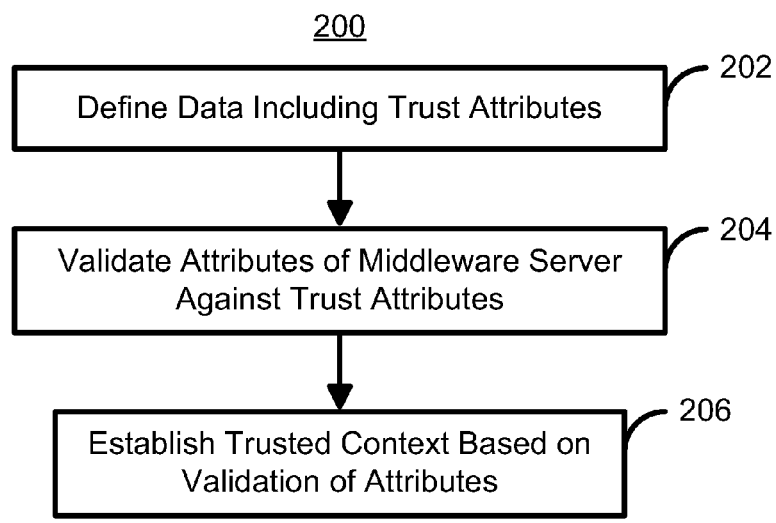
FIG. 4 is a high-level flow chart depicting one embodiment of a method in accordance with the present invention for establishing and using a trusted context for a middleware server and a data server.

FIG. 4 is a high-level flow chart depicting one embodiment of a method 200 in accordance with the present invention for establishing and using a trusted context for a middleware server 120 and a data server 140. For clarity, the method 200 is described in the context of the system 100. However the method 200 might be used with another system (not shown). Thus, the method 200 is described in the context of a connection between the middleware server 120 and the data server 140. It is also presumed that the data 160 corresponds to the trusted context.

Data 160 for the trusted context is defined, via step 202. Step 202 includes defining the trust attributes 162. Step 202 is preferably performed by a database administrator (not shown) having the authority to define trusted contexts for the data server 140. In one embodiment, step 202 may include defining any roles 164, if any, associated with the trusted context as a whole and/or to individual end users within that context. However, at least the trust attributes are defined. Attributes of the middleware server 120 are validated against the trust attributes 162, via step 204. Step 204 is preferably performed in response to a request for a connection from the middleware server 120. The request for the connection would include attributes of the middleware server 120, such as the address and user identification of the middleware server. In one embodiment, the middleware server 120 can provide additional information in the request, such as attributes of the client 122 or 124 and/or attributes of the end user. The trusted connection may then be established based upon the results of the validation, via step 206. In one embodiment, if the attributes match the trust attributes, then the trusted connection is established in step 204. If the attributes do not match the trust attributes, then in one embodiment, a connection that is not trusted could be established or an error message could be provided and the connection suspended.

Using the method 200, a trusted connection may be established. Such a connection might be reused and user privileges may be managed with a finer granularity. For example, end user(s) may be required to input their user identification before using the trusted context. In addition, access to certain database objects, such authorized users, and other features of the trusted connection may be validated. Consequently, security and performance may be improved.

Figure 5:
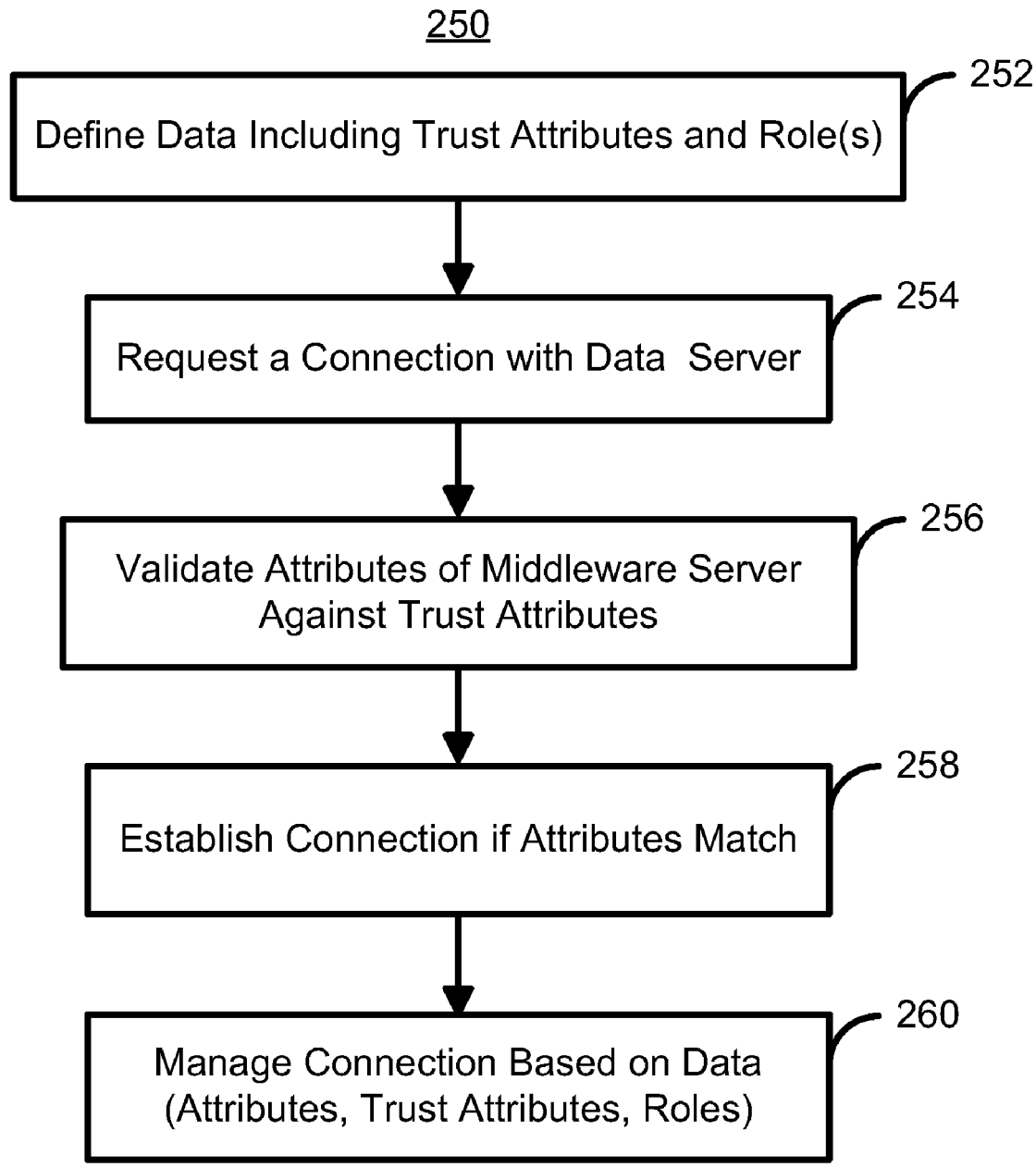
FIG. 5 is a more detailed flow chart depicting one embodiment of a method in accordance with the present invention for establishing and using a trusted context for a middleware server and a data server.

FIG. 5 is a more detailed flow chart depicting one embodiment of a method 250 in accordance with the present invention for establishing and using a trusted context for a middleware server 120 and a data server 140. For clarity, the method 250 is described in the context of the system 100. However the method 250 might be used with another system (not shown). Thus, the method 250 is described in the context of a connection between the middleware server 120 and the data server 140. It is also presumed that the data 160 corresponds to the trusted context.

Data 160 for the trusted context is defined, via step 252. Step 252 includes defining the trust attributes 162. Step 252 is preferably performed by a database administrator (not shown) having the authority to define trusted contexts for the data server 140. In one embodiment, step 252 may include defining any roles 164, if any, associated with the trusted context as a whole and/or for individual end users within the context.

A request for connection is made by the middleware server 120, via step 254. Step 254 includes the middleware server 120 providing the appropriate attributes for validation. The attributes of the middleware server 120 may include such as the address and user identification of the middleware server. In one embodiment, additional information such as attributes of the client 122 or 124, such as their addresses, or attributes of the end user such as their user identification, might be provided by the middleware server 120 in the request.

In response to the request for a connection from the middleware server 120, the attributes of the middleware server 120 are validated against the trust attributes 162, via step 256. Step 256 is performed by the data server 140. If the attributes of the middleware server 120 match the trust attributes 162, then the connection having the trusted context is established, via step 258. If the attributes do not match the trust attributes, then in one embodiment, a connection that is not trusted could be established or an error message could be provided and the connection suspended. Once the connection having the trusted context is established, the connection is managed based upon the trusted context, via step 260. In particular, step 260 utilizes the roles 164 and other data 160 to manage the trusted context. For example, access to certain data objects of the database 160 may be restricted for certain end users. Some or all of the users may also be able to reuse the connection with or without re-authentication. Moreover, the trusted context may have a time limit. In such an embodiment, step 260 would include terminating the connection after the time limit expires.

Using the method 250, a trusted connection may be established. Such a connection might be reused and user privileges may be managed with a finer granularity. For example, end user(s) may be required to input their user identification before using the trusted context. In addition, access to certain database objects, such authorized users, and other features of the trusted connection may be validated. Consequently, security and performance may be improved.

A system for providing a trusted context has been disclosed. The present invention has been described in accordance with the embodiments shown, and one of ordinary skill in the art will readily recognize that there could be variations to the embodiments, and any variations would be within the spirit and scope of the present invention. Software written according to the present invention is to be stored in some form of computer-readable medium, such as memory, CD-ROM or transmitted over a network, executed by a processor. Accordingly, many modifications may be made by one of ordinary skill in the art without departing from the spirit and scope of the appended claims.

We claim:

1. A computer-readable recording medium storing instructions for controlling a computer system to establish a connection between a middleware server and a data server, by a method comprising:

defining data for a trusted context, the data for the trusted context comprising a role that corresponds to at least one privilege on the data server associated with at least one end user, and a plurality of trust attributes corresponding to the defined data between the middleware server and the data server, the plurality of trust attributes comprising at least one of attributes of the middleware server and attributes of at least one end user connected to the middleware server;

receiving a request for the connection from the middleware server including a plurality of middleware attributes;

in response to the received request, validating by matching the plurality of middleware attributes as against the defined plurality of trust attributes;

in response to the validating, establishing the connection to be one of a trusted connection, a non-trusted connection, a temporary connection, and a suspended connection in relation to validation match results; and managing a resulting trusted connection based on the defined trusted context and the role by providing the privilege on the data server to the associated at least one end user.

2. The medium of claim 1 wherein the instructions further include:

establishing the trusted connection if the plurality of middleware attributes matches the plurality of trust attributes, and establishing one of a non-trusted connection, a temporary connection, and a suspended connection if the plurality of middleware attributes does not match the plurality of trust attributes.

3. The medium of claim 1 wherein the defining instructions further include:

defining a role for the trusted context, the role corresponding to at least one privilege on the data server wherein the role provides for refined management of a resulting trusted connection.

4. The medium of claim 3 wherein the at least one privilege includes limiting access to at least one database object to at least one user.

5. The medium of claim 4 wherein the at least one user includes at least one end user.

6. The computer-readable medium of claim 3 wherein the role limits the privilege to at least one end user and wherein the program further includes instructions for:
 allowing an end user to provide an end user identification;
 validating the end user identification to determine whether the end user is included in the at least one end user; and
 allowing the end user to access the privilege if the end user is one of the at least one end user.

7. The medium of claim 3 wherein the privilege further includes allowing reuse of the connection.

8. The medium of claim 7 wherein allowing reuse of the connection requires re-authentication of an end user.

9. The medium of claim 1 wherein the defining instructions further include:
 setting a time limit for the trusted connection.

10. The medium of claim 9 wherein the program further includes:
 terminating the trusted connection if the time limit is reached.

11. The medium of claim 1 wherein the defining instructions further include:
 requiring the trusted connection to be re-established on reuse.

12. The medium of claim 11 wherein the requiring instructions further include:
 requiring an end user to provide an end user identification upon request for a connection.

13. A computer-readable recording medium storing instructions for controlling a computer system to establish a connection between a middleware server and a data server, by a method comprising:
 defining data for a trusted context, the trusted context comprising a role that corresponds to at least one privilege on the data server associated with at least one end user, and a plurality of trust attributes corresponding to the defined data between the middleware server and the data server, the plurality of trust attributes comprising at least one of attributes of the middleware server and attributes of at least one end user connected to the middleware server;
 receiving a request for the connection from the middleware server including a plurality of middleware attributes;
 in response to the received request, validating by matching the plurality of middleware attributes as against the defined plurality of trust attributes;
 in response to the validating, establishing the connection to be one of a trusted connection, a non-trusted connection, a temporary connection, and a suspended connection in relation to validation match results; and
 managing a resulting trusted connection based on the defined trusted context and the role by providing the privilege on the data server to the associated at least one end user.

14. The medium of claim 13, wherein the role further includes at least one of allowing access to at least one privilege based on an end user identification, limiting access to at least one database object to at least one user.

15. A data server capable of having a connection between a middleware server and a data server comprising:
 data corresponding to a trusted context between the middleware server and the data server, the data including a plurality of trust attributes corresponding to the trusted context;
 a trust attribution validation block for validating the plurality of trust attributes against a plurality of middleware attributes corresponding to the middleware server, the plurality of attributes provided in a connection request;
 a connection block for establishing the trusted connection based on the validating the plurality of trust attributes,
 wherein the data server establishes a connection with the middleware server by a method comprising:
 defining data for a trusted context between the middleware server and the data server, the data for the trusted context comprising a role that corresponds to at least one privilege on the data server associated with at least one end user, and a plurality of trust attributes corresponding to the trusted context between the middleware server and the data server, the plurality of trust attributes comprising at least one of attributes of the middleware server and attributes of at least one end user connected to the middleware server;
 receiving a request for the connection from the middleware server including a plurality of middleware attributes;
 in response to the received request, validating by matching the plurality of middleware attributes as against the defined plurality of trust attributes using the trust attribution validation block;
 in response to the validating, establishing the connection to be one of a trusted connection, a non-trusted connection, a temporary connection, and a suspended connection in relation to validation match results via the connection block; and
 managing a resulting trusted connection based on the defined trusted context and the role by providing the privilege on the data server to the associated at least one end user.

16. The data server of claim 15 wherein the connection block further establishes the trusted connection if the plurality of middleware attributes matches the plurality of trust attributes.

17. The data server of claim 16 wherein the at least one privilege includes limiting access to at least one database object to at least one user.

18. The data server of claim 15 wherein the at least one user includes at least one end user.

19. The data server of claim 15 wherein the role further limits the privilege to at least one end user.

20. The data server of claim 15 wherein the privilege further includes allowing reuse of the connection.

21. The data server of claim 20 wherein the reuse of the connection requires re-authentication of an end user.

22. The data server of claim 15 wherein the data further includes a time limit for the trusted connection.

23. The data server of claim 21 wherein the connection block further terminates the trusted connection if the time limit is reached.

24. The data server of claim 15 wherein data further requires the trusted connection to be re-established on reuse.

25. A method for making a computer implemented process to enable a computer system to establish a connection between a middleware server and a data server, said method comprising:
 installing first computer instructions onto a computer-readable recording medium, said first instructions configured to define data for a trusted context, the data for the trusted context comprising a role that corresponds to at least one privilege on the data server associated with at least one end user, and a plurality of trust attributes corresponding to the defined data between the middleware server and the data server, the plurality of trust attributes comprising at least one of attributes of the middleware server and attributes of at least one end user connected to the middleware server;

installing second computer instructions onto a computer-readable recording medium, said second instructions configured to receive a request for the connection from the middleware server including a plurality of middleware attributes;

installing third computer instructions onto a computer-readable recording medium, said third instructions configured to, in response to the received request, validate by matching the plurality of middleware attributes as against the defined plurality of trust attributes;

installing fourth computer instructions onto a computer-readable recording medium, said fourth instructions configured to, in response to the validating, establish the connection to be one of a trusted connection, a non-trusted connection, a temporary connection, and a suspended connection in relation to validation match results; and installing fifth computer instructions onto a computer-readable recording medium, said fifth instructions configured to manage a resulting trusted connection based on the defined trusted context and the role by providing the privilege on the data server to the associated at least one end user.

\* \* \* \* \*